Oct. 3, 1961     H. G. COOK     3,002,589
CASTER WHEEL BRAKE MECHANISM
Filed May 26, 1960     2 Sheets-Sheet 2
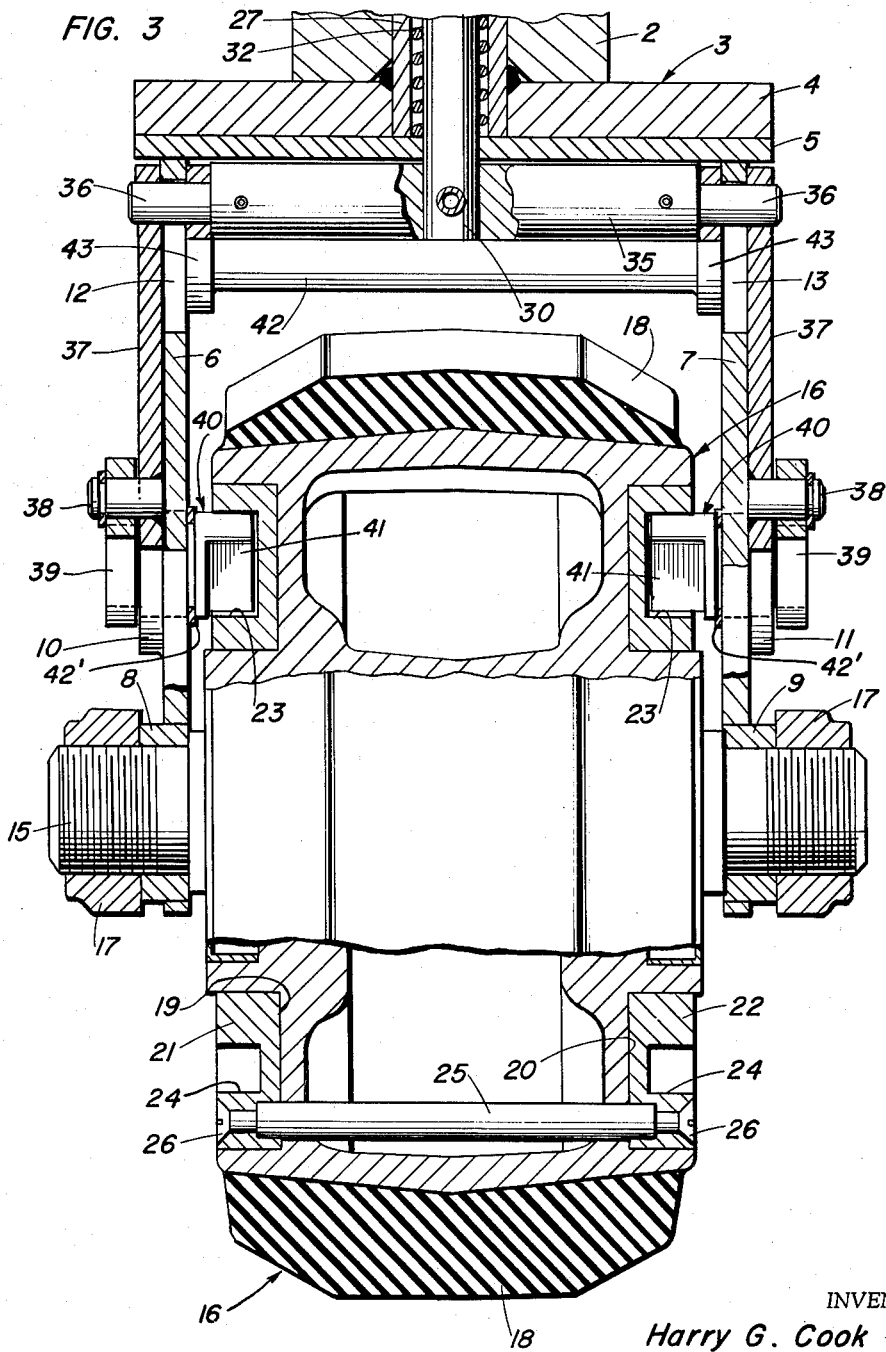
INVENTOR
Harry G. Cook
BY
ATTORNEYS

United States Patent Office 3,002,589
Patented Oct. 3, 1961

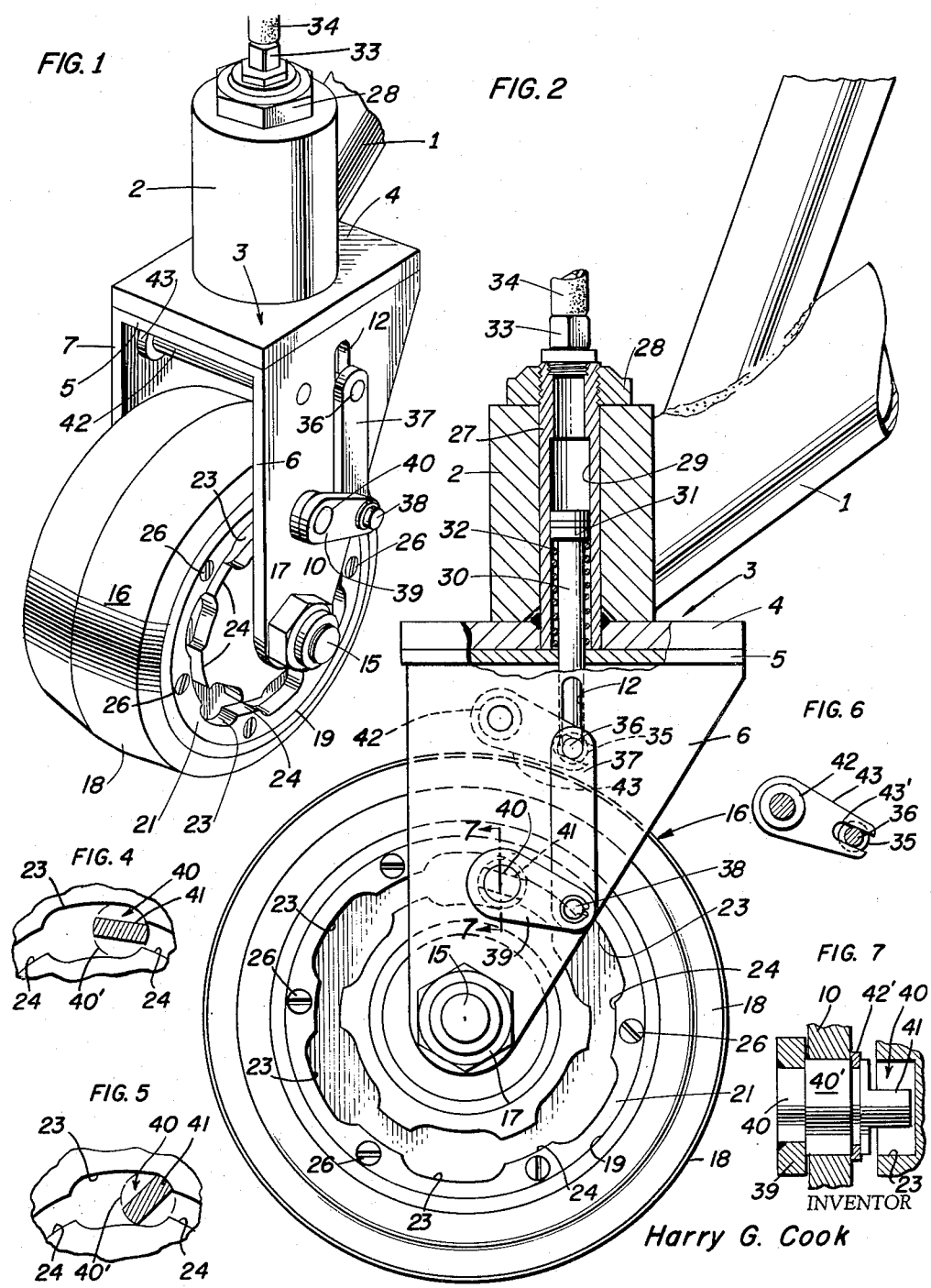

3,002,589
CASTER WHEEL BRAKE MECHANISM
Harry G. Cook, Rockville, Md., assignor to the United States of America as represented by the Secretary of the Navy
Filed May 26, 1960, Ser. No. 32,055
9 Claims. (Cl. 188—69)

The present invention relates to an improved caster wheel brake mechanism, and more particularly to a "dead-man" type braking device that will insure positive locking of a caster wheel of the type used on dollies employed for transporting heavy equipment.

The invention contemplates the provision of a brake mechanism wherein a pressure responsive element or device controls the operation of the brake mechanism and maintains the brake in an "off" or released condition and in which a spring connected to the pressure responsive device reverses the operation of the brake mechanism and maintains the brake in an "on" or applied condition when the actuating pressure on the pressure responsive device is released.

An object of the invention resides in the provision of a caster wheel brake mechanism that will function efficiently and smoothly with a minimum of maintenance and care.

Still other objects of the invention are to provide a caster wheel brake mechanism that will require no adjustment, will be non-self-energizing, and will be of simple and rugged construction.

As another object, the invention embodies novel construction for assuring uniform distribution of braking force to the opposite sides of the caster wheel, so that binding of the wheel or distortion of the brake mechanism will be prevented.

Other objects and many of the attendant advantages of this invention will be readily appreciated as the same becomes better understood by reference to the following detailed description when considered in connection with the accompanying drawings wherein:

FIG. 1 is a perspective view of the caster wheel brake mechanism constructed in accordance with the present invention;

FIG. 2 is an enlarged side view of the device, partially in elevation and partially in section illustrating the device in a released condition;

FIG. 3 is an enlarged vertical sectional view of the brake mechanism, illustrating the linkage and the shoe and slot structure, parts of the mechanism being shown in elevation and in a braking position;

FIG. 4 is a fragmentary view illustrating the brake shoe in released condition;

FIG. 5 is a view similar to FIG. 4 illustrating the brake shoe in a braking position;

FIG. 6 is a fragmentary view of the linkage between the equalizing bar and the actuating element; and FIG. 7 is a fragmentary sectional view taken on the line 7—7 of FIG. 2.

Referring now more particularly to the drawings, the numeral 1 indicates generally the lower end portion of a leg of a dolly of the type used for handling heavy equipment or material in an ordnance or industrial plant. The leg 1 carries a cylindrical caster mount 2. Mounted for pivotal movement about the caster mount 2 is a caster unit 3 which is provided with a yoke or fork having a flat top wall 4, a bight 5, and spaced flat parallel legs 6 and 7. As best seen in FIGS. 2 and 3, the legs taper in width toward their free ends, and are fitted with aligned sleeves 8 and 9 which support the axle, referred to hereinafter. The legs 6 and 7 are also fitted with bushings 10 and 11 which are located above the sleeves 8 and 9 and mount the brake shoes, to be described in more detail hereinafter. Slots 12 and 13, vertically arranged and horizontally aligned, are formed in the yoke legs 6 and 7 near their upper ends.

Rotatably mounted between the legs 6 and 7 of the yoke, by an axle 15 supported within the sleeves 8 and 9, is a caster wheel 16 with suitable bearings. The ends of the axle 15 are threaded to receive retaining nuts 17. The wheel 16 is fitted with a conventional rubber tire 18, and is formed with circular recesses 19 and 20 in its opposite side walls. Forming a part of the brake mechanism are hardened steel annuli 21 and 22 which are mounted, respectively, in the recesses 19 and 20. The annuli 21 and 22 are each formed with a circumferentially arranged series of relatively wide, substantially elliptical grooves 23 which are connected by relatively narrow arcuate grooves 24, the grooves 23 and 24 communicating with the outer surface of each of the annuli. The annuli are positioned in the grooves with the elliptical grooves of one annulus in axial alignment with those of the other annulus, and to maintain the grooves in alignment tie rods 25 are employed. The tie rods 25, seen in FIG. 3, are arranged in a circumferential series and pass through the wheel casting near the rim thereof. Screws 26 connect the opposite ends of the rods 25 to the annuli. The tie rods assist in distributing braking effort uniformly to both sides of the wheel.

As best seen in FIG. 2, the caster unit 3 includes a hollow stem 27 which extends through and is secured to the top wall 4 of the yoke and is rotatable in the caster mount 2. The lower end of the stem abuts the upper surface of the bight 5, the upper end of said stem being threaded to receive a retaining nut 28. The interior of the stem is bored and shouldered to define a cylinder 29. A plunger 30, having a piston 31 on its upper end, is movably mounted in the cylinder 29 and extends downwardly through the wall 4 and bight 5. A coil spring 32, confined within the cylinder between the piston 31 and the bight 5 and surrounding the plunger 30, exerts an upward force upon said plunger, as will be explained in more detail hereinafter. The upper end of the stem is internally threaded to receive the fitting 33 of a hydraulic line 34.

Mounted between the legs 6 and 7 of the yoke beneath the bight thereof is an actuating element 35. As best seen in FIG. 3, the actuating element is suitably secured to the lower end of the plunger 30 and carries a pin 36 at each end, said pins extending through the slots 12 and 13 and beyond the outer surfaces of the legs 6 and 7. Secured to the outer end portion of each of the pins 36 is a link 37. The links 37 are slidable on the outer surfaces of the legs of the yoke and carry pivot pins 38 at their lower ends, the pivot pins operatively connecting links 37 to levers 39 at their outer ends. The inner end portions of the levers 39 are secured to the outer ends of brake shoes generally indicated by the numeral 40 and mounted for rocking movement in the bushings 10 and 11 carried by legs 6 and 7. The brake shoes 40 include cylindrical portions 40' mounted in bushings 10 and 11 and having flat-sided dogs 41 that extend inwardly from the portions 40' and into the grooves 23 and 24. Snap rings 42' retain the brake shoes in the bushings 10 and 11. For a more complete understanding of the aforesaid arrangement attention is directed to FIG. 7, wherein one of the brake shoe arrangements is illustrated.

By referring to FIG. 2, it will be seen that the plunger 30 is illustrated in its lowermost position, the pins 36 on the actuating element 35 are at the lower ends of the slots 12 and 13, the links 37 are in their lowermost positions, the outer ends of the levers 39 being tilted downwardly and the dogs 41 of the brake shoes 40 being disposed in the grooves 23, 24 in such positions that their flat sides will clear the grooves, as best shown in FIG. 4. The wheel 16 will thus be permitted to rotate freely. The plunger 30 is moved to the position shown in FIG. 2, when fluid under pressure is admitted into chamber 29 by way of line 34 and acting on the piston 31, thus maintaining the brake mechanism in a released position.

Upward movement of the plunger 30 by the spring 32, when the pressure is released from the chamber, causes links 37 to move in an upward direction. When this occurs the levers 39 rock the shoes 40 in the bushings 10 and 11 so that the flat-sided dogs 41 of the shoes move out of alignment with the relatively narrow grooves 24 and into contact with the end portions of the grooves 23 for locking the wheel, as best shown in FIG. 5. It will be understood that, if the flat sides of the shoes happen to be in the narrow grooves 24 at the instant braking force is applied, the wheel will continue to rotate until the flat sides clear the narrow grooves and contact the opposite ends of the adjacent elliptical grooves 23.

The application of pressure on the piston 31 will cause compression of the spring and lower the plunger 30 and, by movement of the actuating element 35 and links 37, shoes 41 move to positions aligning the flat sides thereof with the narrow grooves 24, when the wheel 16 will again be permitted to rotate freely.

Attention is particularly directed to the fact that there will be no tendency of the shoes 41 to grab or stick. Therefore, the mechanism will not be self-energizing.

It will be clear from the foregoing that slight misalignment of the grooves in one of the wheel annuli 21, 22 with those in the other annuli could cause distortion or binding of the actuating element 35 and its associated parts upon the application of pressure to the plunger 30. To prevent such distortion or binding there is provided an equalizing bar 42 which is mounted between the legs 6 and 7 of the yoke forwardly of the actuating element. The equalizing bar 42 has integral arms 43 which are notched at their free ends as at 43', FIG. 6, to engage freely about the pins 36 at the ends of the actuating element 35. It will be understood that when the actuating element 35 is moved downwardly by the plunger 30, in response to pressure applied to piston 31 the equalizing bar 42 and arms 43 will be rocked downwardly, and the force applied to the actuating element will be proportionally distributed between the actuating element through the equalizing bar to the brake shoes as determined by the load thereon resulting from the afore-mentioned misalignment. That is, the equalizing bar, rocker arms, and actuating element, with pivot points at the ends of said bar and element, provide a "square" actuator construction that prevents unequal motion of both brake shoes during releasing of the brakes which would otherwise occur as a result of unequal forces acting on the brake shoes due to the afore-mentioned misalignment of the grooves in the wheel annuli and therefore equalizes the movement of the shoes 41. Suitable bearings in the caster mount (not shown) and swivel joints (not shown) in the hydraulic system may be provided as required by the particular environment in which the invention is used.

From the foregoing, it will be understood that the brake mechanism is normally maintained in an off condition by hydraulic pressure within pressure chamber 29. In the event the dolly should become unmanageable on a sloping deck of a ship or the like, release of the hydraulic pressure within the chamber 29 will instantly cause the brake mechanism to be operated and thus apply braking action to the wheel 16.

Obviously many modifications and variations of the present invention are possible in the light of the above teachings. It is therefore to be understood that within the scope of the appended claims the invention may be practiced otherwise than as specifically described.

What is claimed is:

1. A caster wheel brake mechanism comprising a caster unit having a yoke, spaced legs on the yoke, a caster wheel, means rotatably mounting the caster wheel between the legs of the yoke, and brake means carried by the yoke and wheel, said brake means comprising a brake annulus on each side of the wheel and secured thereto, means securing a brake annulus on each side of the wheel, each said annulus having a circular groove consisting of a series of relatively wide elliptical groove portions connected by relatively narrow arcuate groove portions, brake shoes rockably carried by the yoke legs and normally disposed in the circular grooves, a movable linkage, said linkage including rockable means connected to the brake shoes and the linkage for imparting rocking movement to the shoes upon movement of said rockable means by said linkage so that said shoes either engage in said elliptical grooves for locking the wheel or clear said elliptical and arcuate grooves for permitting free rotation of the wheel and means connected to said linkage for imparting said movement thereto.

2. A caster wheel brake mechanism including a caster wheel, a yoke rotatably mounting the caster wheel, said wheel having a brake annulus in each side wall thereof and secured thereto, means carried by said wheel for securing a brake annulus on each side thereof, each said annulus having a circular groove consisting of elliptical groove portions connected by arcuate groove portions, brake shoes rockably carried by the yoke and disposed in the circular grooves, movable means including rockable elements connected to the brake shoes and the movable means for rocking the shoes to positions to engage in the elliptical portions to lock the wheel or to positions to clear said elliptical and arcuate groove portions to permit rotation of the wheel as said movable means is actuated, and means operatively connected to said movable means for actuating the movable means.

3. A caster wheel brake mechanism as recited in claim 2, wherein said brake annulus securing means includes a plurality of tie rods carried by the wheel and connected to the annulus on each side thereof so that the elliptical groove portions of one annulus are in alignment with those of the other annulus.

4. In a caster wheel brake mechanism, a caster wheel having an annulus mounted in each side wall thereof, means including a plurality of securing devices carried by the wheel and connected to the annulus on each side wall thereof for securing the annulus thereto, each said annulus having serially connected relatively wide and relatively narrow grooves, a yoke rotatably mounting the caster wheel, brake shoes mounted for rocking movement in the legs of the yoke and having flat-sided dogs normally disposed between the grooves, and brake shoe rocking means carried by the yoke and operatively connected thereto for rocking the shoes to positions for engaging the dogs in the relatively wide grooves for locking the wheel against rotation.

5. A caster wheel brake mechanism as recited in claim 4, wherein said brake shoe rocking means includes an actuating element movably mounted on the yoke, a slidably mounted plunger connected to said actuating element for moving the actuating element, levers connected to the brake shoes for imparting rocking movement thereto as the lever is actuated, and links connecting the actuating element with the levers for actuating the levers as the actuating element is moved by said plunger.

6. A caster wheel brake mechanism as recited in claim 5, including additionally an equalizing bar pivotally mounted in the yoke and having arms connected to the actuating element and means carried by said actuating element for connecting arms to the element.

7. In a caster wheel brake mechanism, a caster wheel having a pair of mutually spaced oppositely disposed side walls, each side wall being provided with an annular recess, an annulus disposed in each recess and having a plurality of serially connected wide grooves and a plurality of serially connected narrow grooves bordering on a centrally disposed annular passageway, a yoke having a pair of mutually spaced legs, one of each of the pair of legs being disposed in proximate relation with respect to each annulus, means carried by and disposed between said legs for rotatably mounting a wheel therebetween, a brake shoe rotatably supported in one of each of said pair of legs and having flat sided dogs normally disposed in said circular passageway, an actuating element movably mounted in said spaced legs, a slidably mounted plunger carried on the yoke and connected to said actuating element for shifting the element, equalizing means pivotally mounted on the legs and operatively connected to said actuating element, a lever carried by each of the brake shoes for actuating the brake shoes to move said dogs into said wide grooves an amount sufficiently to lock the wheel against rotation, and a link connecting the lever of each brake shoe with the actuating element and the equalizing means for actuating each lever and the equalizing means in unison as the actuating element is shifted by the plunger.

8. A caster wheel brake mechanism including a yoke having a pair of mutually spaced legs with a slot formed in one of each of said pair of legs in alignment with respect to each other, a caster wheel rotatably mounted on said legs, said wheel having wide serially connected grooves and narrow serially connected grooves formed on each side thereof, said yoke having a hollow stem and a cylinder disposed therein, a piston slidably disposed within said cylinder, a plunger connected to the piston, an actuating element carried by and movably supported on said legs, said plunger being connected to the actuating element and movable by fluid pressure acting on the piston for shifting the element in the slots, a brake shoe pivotally mounted on one of each of said pair of legs adjacent the grooves on each side of the wheel, each brake shoe being provided with a flat-sided dog normally out of engagement with said grooves, a pin formed on each terminal end of the actuating element and disposed within the slot in one of each of said pair of legs for movably supporting the element on the legs, a lever carried by each brake shoe, and a link connecting each pin with each lever, said movement of the plunger and shifting of the actuating element within the slots causing each link and each lever to be actuated an amount sufficiently to move the dog on each brake shoe into locking engagement with the wide grooves on each side of the wheel.

9. A caster wheel brake mechanism including a yoke having a pair of mutually spaced legs, each of said legs having a slot formed therein, a caster wheel rotatably mounted on said legs, said wheel having wide serially connected grooves and narrow serially connected grooves formed on each side thereof, said yoke having a hollow stem and a cylinder disposed therein, a piston slidably disposed within said cylinder, a plunger connected to the piston, an actuating element carried by and movably supported on the legs, said plunger being connected to the actuating element and movable by fluid pressure acting on the piston for shifting the element in the slots, a brake shoe pivotally mounted on one of each of said pair of legs, each brake shoe being provided with a dog normally out of engagement with said grooves, a pin formed on each terminal end of the actuating element and disposed within the slot in one of each of said pair of legs for movably supporting the element on the legs, a lever carried by each brake shoe, a link connecting each pin with each lever, said movement of the plunger and shifting of the actuating element causing each link and each lever to be actuated an amount sufficiently to move the dog on each brake shoe into locking engagement with the wide grooves on each side of the wheel, an equalizing bar pivotally mounted on said legs, and a pair of mutually spaced arms carried by said equalizing bar, each arm of said pair of arms being freely connected to the pin on each terminal end of the actuating element and movable therewith upon said movement of the plunger and shifting of the actuating element.

References Cited in the file of this patent

UNITED STATES PATENTS

| | | |
|---|---|---|
| 1,599,485 | Perin | Sept. 14, 1926 |
| 2,262,288 | Klipstein et al. | Nov. 11, 1941 |
| 2,854,111 | Simonsen | Sept. 30, 1958 |

FOREIGN PATENTS

| | | |
|---|---|---|
| 142,968 | Switzerland | Jan. 2, 1931 |